April 14, 1942.  W. MYERS  2,279,593
SECURING MEANS
Filed Aug. 30, 1939

Witness:
John H. Cave

Inventor
Walter Myers
By Henry J. Miller
Attorney

Patented Apr. 14, 1942

2,279,593

UNITED STATES PATENT OFFICE 2,279,593

SECURING MEANS

Walter Myers, Bridgeport, Conn., assignor to The Singer Manufacturing Company, Elizabeth, N. J., a corporation of New Jersey Application August 30, 1939, Serial No. 292,562

2 Claims. (Cl. 287—53)

This invention relates to means for securing ball bearings, collars, rings or other similar apertured members to shafts, bars or other similar penetrant members.

The invention has for an object the provision of a securing means of the class described which will be effective and inexpensive to manufacture, and which may be easily manipulated to secure or release the apertured member.

A further object of the invention is to provide the penetrant member with securing means of the class described, which will function without distortion or warping of the apertured member.

Several other objects and features of the present invention will be clearly understood from the following description and accompanying drawing, in which.

Figure 1:
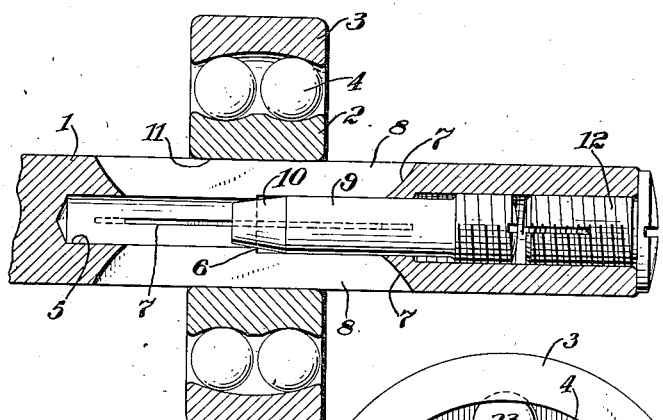
Fig. 1 represents a longitudinal section of a shaft carrying a ball bearing and embodying the invention.
Figure 2:
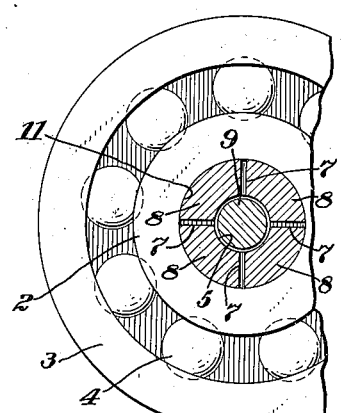
Fig. 2 represents a transverse section of the shaft, illustrating the ball bearing in elevation.

In the embodiment of the invention illustrated in the drawing, a shaft 1 has mounted thereon a ball bearing-unit of the well known SKF type having inner and outer ball-races or rings 2 and 3 with a series of balls 4 interposed between the races. In securing a ball bearing-unit upon a shaft, the problem is presented of providing suitable means to secure the inner race of such bearing-unit to the shaft without distortion of the inner race and in such a manner that it may be readily applied to and removed from such shaft. According to the present improvement as illustrated in Figs. 1 and 2, the shaft 1 is formed with a stepped central longitudinal bore 5 providing an annular shoulder 6. Intermediate the ends of the longitudinal bore 5 the shaft is formed with a plurality of longitudinal slots 7 preferably spaced equidistantly about the circumference of the shaft 1, dividing said shaft into an equal number of expansible sections 8. In the shaft disclosed in Figs. 1 and 2 there are four such slots, but it is to be understood that this number can be varied without departing from the spirit of the invention.

Threaded into the outer end of the longitudinal bore 5 in the shaft 1 is an expanding screw 9 having a tapered inner end 10 which engages the shoulder 6; the engagement between the tapered inner end 10 of the expander and the shoulder 6 throughout the entire range of adjustment of the expander being in the form of a line as distinct from a surface, the said line of engagement being in the form of a circle. The height of the shoulder 6 and the taper 10 of the expanding screw are such that by applying a screw-driver endwise of the shaft 1 to the screw 9 the expansible sections 8 of the shaft 1 are caused to expand into firm engagement with the shaft-contacting wall 11 of the race 2, thus securely tightening such member to the shaft. To prevent dirt from collecting in the outer end of the bore 5 there is threaded into the bore a cap-screw 12.

One of the important features of the present invention is that, as shown in Fig. 1, the longitudinal slots 7 do not open into the ends of the shaft 1, but terminate a substantial distance therefrom. This is of importance for the reason that after the sections 8 have been expanded into engagement with the inner race 2 of the bearing-unit for a considerable length of time they frequently become permanently expanded and do not recover to their original position when the expanding screw is released and the bearing-unit removed. It can be appreciated that in replacing the bearing-unit upon the shaft, whose diameter had been increased by the failure of the expansible sections to resume their original positions, considerable difficulty would be experienced in compressing the expansible sections to the point where the shaft would enter the aperture in the inner race of the bearing, and particularly so when the shaft has not been removed from the machine of which it is a part. The present invention obviates this difficulty by the fact that the expansible sections are formed intermediate the end-portions of the shaft and when so located do not affect in any way the diameter of the shaft at its ends, regardless of whether the expansible sections recover to their original positions or not.

Figure 5:
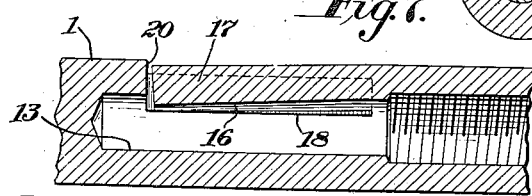
Fig. 5 represents a longitudinal section of the shaft of Fig. 3, with the expanding screw removed and the key-tongue in its non-wedging position.
Figure 6:
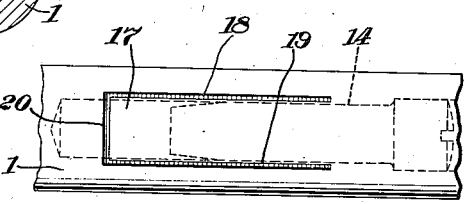
Fig. 6 is a top plan of the shaft in Fig. 5, showing the key-tongue in elevation.
Figure 3:
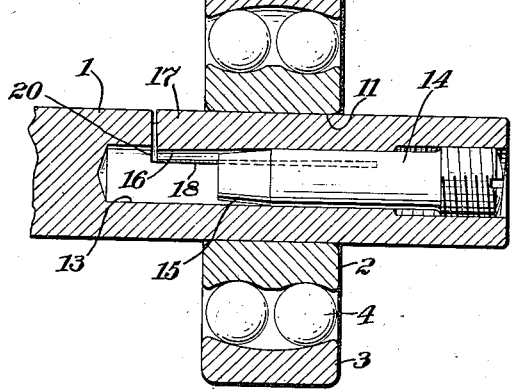
Fig. 3 represents a view similar to Fig. 1, showing a modification of the ball bearing securing means.

Figs. 3 to 6, inclusive, of the drawing disclose a modification of the securing means illustrated in Figs. 1 and 2. In these figures, the shaft 1 is formed with a longitudinal bore 13 in which is positioned an expanding screw 14 having a tapered end 15 adapted to engage the inner inclined surface 16 of the wedged-shaped key-tongue 17 formed in the shaft 1. As in the device disclosed in Figs. 1 and 2, the tapered expanding screw forces the key-tongue 17 into wedging engagement with the shaft-contacting wall of the race 2, thus securely tightening the race to the shaft. By forming the tongue 17 so that its free end extends in a direction away from the end of the shaft which is provided with the screw 14, as shown in Fig. 3, the ball bearing-unit may be conveniently replaced upon the shaft, regardless of whether the tongue 17 springs back to its original position, as shown in Fig. 5.

The preferred method of constructing the key-tongue, as shown in Figs. 3 to 6, inclusive, comprises cutting into the bored shaft two parallel longitudinal slots 18, 19 and a transverse slot 20, each of which opens into the bore in the shaft. These slots are cut into the shaft 1 while it is oversize and before it is ground to its proper diameter. After the slots have been cut, pressure is applied upon the free end of the tongue 17, bending it into the bore 13 of the shaft 1, as illustrated in Fig. 5. After the tongue has been forced into this position the shaft is ground to size. As a result of the grinding operation the free end of the key-tongue 17 is thicker than it is at the point where it joins the shaft 1. This unequal thickness of the key-tongue 17, in effect, produces a wedge-element whose inner face 16 is inclined, and when engaged by the tapered extremity 15 of the expanding screw 14 forces the outer surface of the tongue 17 into contact with the shaft-contacting wall 11 of the race 2.

Figure 4:
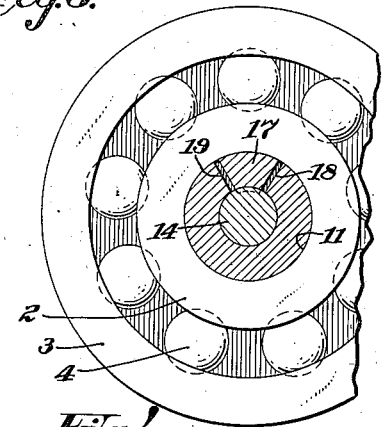
Fig. 4 represents a transverse section of the shaft shown in Fig. 3.

As will be observed in Fig. 4, the key-tongue 17 is segmental-shaped in cross-section and comprises only a small portion of the entire shaft cross-sectional area. This has the advantage of providing greater shaft-rigidity and a cylindrical outer shaft-face in the major portion of the shaft.

Figure 7:
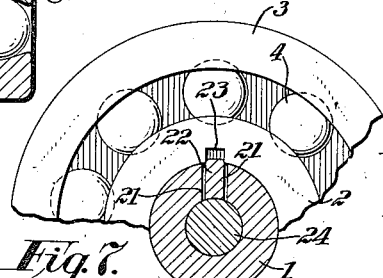
Fig. 7 represents a transverse section similar to Fig. 2, illustrating a second modification of the ball bearing securing means shown in Figs. 1 and 2.

Fig. 7 illustrates a second modification of the ball-bearing securing means shown in Figs. 1 and 2. In this modification, the shaft 1 is formed with two longitudinal slots 21 which, as shown in Fig. 1, do not open into the ends of the shaft, but terminate a substantial distance therefrom. These slots define an expansible section or key 22 adapted to be expanded into a key-way 23 cut into the race 2 of the ball-bearing. The key 22 is forced into the key-way 23 by an expanding screw 24 having preferably the same form as the expanding screw 9 shown in Fig. 1.

In Fig. 7 it will be observed that the key 22 is of greater thickness than the adjacent portions of the shaft 1. This is obtained by following a method of manufacture similar to that described in connection with the key-tongue 17 shown in Figs. 3 to 6, inclusive. The preferred method comprises cutting into the bored shaft two longitudinal slots 21 opening into the bore in the shaft. These slots are cut into the shaft 1 while it is oversize and before it is ground to its proper diameter. After the slots have been cut, pressure is applied upon the key 22 defined by the slots 21 midway its ends, permanently bending the central portion of the key into the bore of the shaft 1. The shaft is then hardened and subsequently ground to size. As in the case of the key-tongue 17 of Figs. 3 to 6, inclusive, this grinding operation produces an expansible section or key having a greater depth at its center than at its opposite ends. This unequal thickness longitudinally of the key 22 produces a wedge-element whose inner face is inclined, and when engaged by the expanding screw 24 forces the outer surface of the key beyond the periphery of the shaft 1 and into the key-way 23 in the race 2, thus securely locking the inner race 2 of the ball-bearing upon the shaft 1.

This modification has all the advantages of the previously described ball-bearing securing means and in addition positively locks the ball-bearing race upon the shaft instead of frictionally securing the race against turning with the shaft.

Having thus set forth the nature of the invention what I claim herein is:

1. In a device of the class described, a shaft having a stepped bore, rigid end-sections and a resilient intermediate section, a ball bearing unit including an inner race mounted snugly upon the resilient section of said shaft, and means located in said bore for expanding the resilient intermediate section of said shaft into locking engagement with the inner race of said bearing unit, said means contacting said resilient section at the edge of said step whereby the contact is in the form of a line as distinct from a surface, the said line of contact being in the form of a circle.

2. In a device of the class described, a shaft having a stepped longitudinal bore, a plurality of longitudinal slots formed in said shaft opening into the shaft-bore and terminating short of the ends of said shaft, said slots providing at least one expanding section integral with the shaft, a ball bearing unit including an inner race mounted snugly upon said shaft intermediate the ends of said expanding section, and an expander located in the bore of said shaft and contacting the interior of said expanding section at the edge of said step whereby the contact between said expander and expanding section is in the form of a line as distinct from a surface, the said line of contact being in the form of a circle.

WALTER MYERS.